United States Patent [19]

Gainsboro et al.

[11] Patent Number: 4,498,423
[45] Date of Patent: Feb. 12, 1985

[54] BIRD FEEDER

[75] Inventors: Leon Gainsboro, Wayland, Mass.; Peter A. Latham, Rye, N.H.

[73] Assignee: OPUS, Inc., Framingham, Mass.

[21] Appl. No.: 455,601

[22] Filed: Jan. 4, 1983

[51] Int. Cl.³ .............................................. A01K 39/01
[52] U.S. Cl. .................................................. 119/51 R
[58] Field of Search ................ 119/24, 26, 51 R, 52 R

[56] References Cited

U.S. PATENT DOCUMENTS

| | | | |
|---|---|---|---|
| 3,505,975 | 4/1970 | Spencer | 119/51 R X |
| 4,188,913 | 2/1980 | Earl et al. | 119/51 R |
| 4,246,869 | 1/1981 | Tobin, Jr. | 119/51 R |
| 4,259,927 | 4/1981 | Clarke | 119/51 R |
| 4,327,669 | 5/1982 | Blasbalg | 119/51 R |
| 4,328,765 | 5/1982 | Kilham | 119/51 R |

FOREIGN PATENT DOCUMENTS 339680 12/1930 United Kingdom ............. 119/51 R

Primary Examiner—Robert P. Swiatek
Attorney, Agent, or Firm—Wolf, Greenfield & Sacks

[57] ABSTRACT

A bird feeding device is provided with a perch which can be adjustably positioned with respect to the feeding opening to selectively accommodate different sizes of birds. The perch is movable toward and away from the feeding opening so that for larger birds the perch is positioned farther from the feeding opening than for smaller birds. The disclosed embodiment also includes a simultaneous heightwise adjustment for the position of the perch so that it is lowered when in its more extended position. Also disclosed is an improved arrangement for attaching the perch and feeding device to the container of the bird feeder. Another aspect of the invention relates to a bird feeder having a storage and feeding tube which is detachably connected to an overhead support by a quick disconnect device which provides for quick and simplified filling of the feed tubes as well as an arrangement which minimizes spilling or loss of bird seed.

13 Claims, 10 Drawing Figures

U.S. Patent  Feb. 12, 1985  Sheet 1 of 3  4,498,423
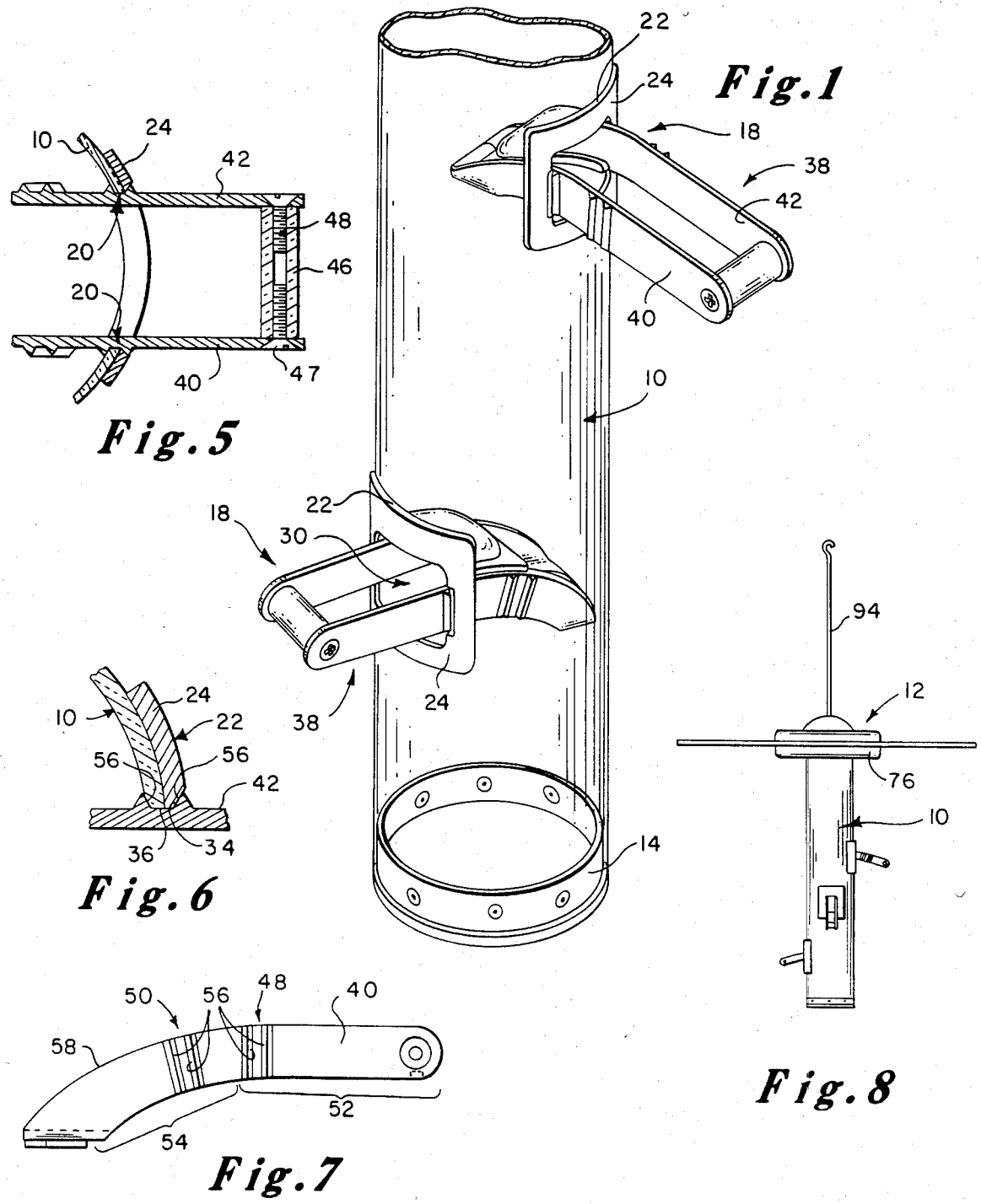

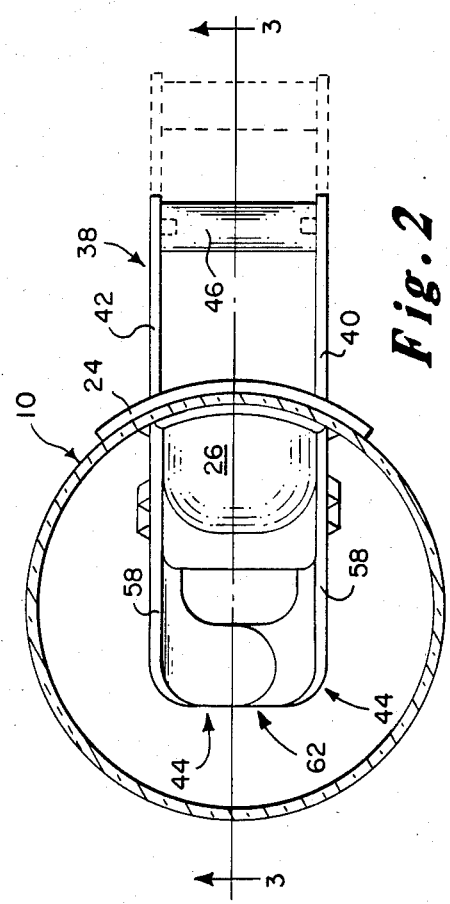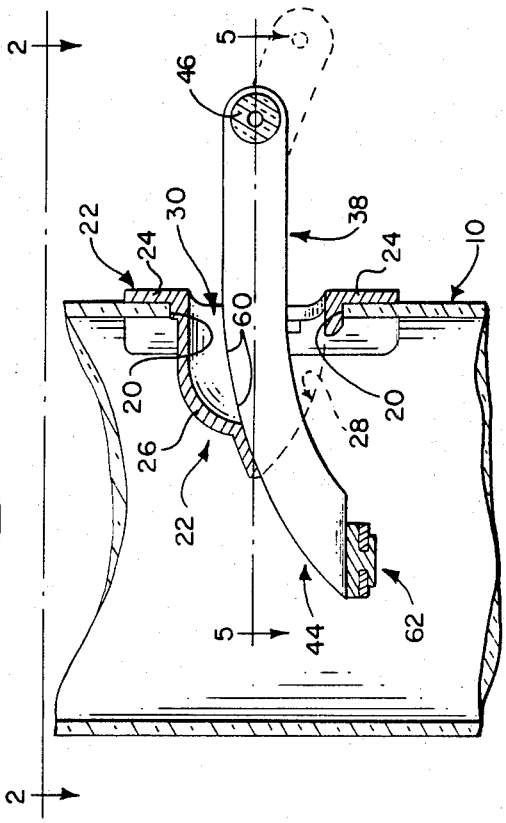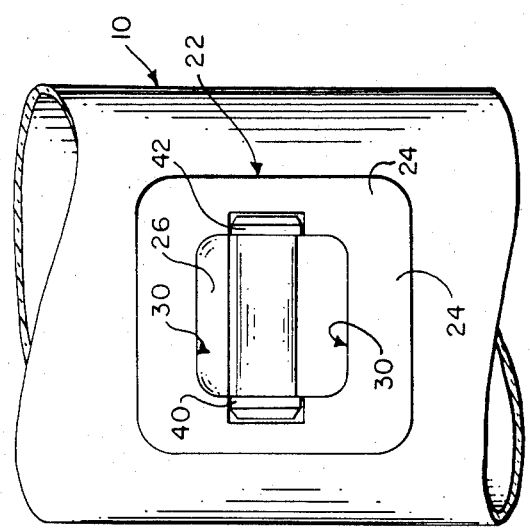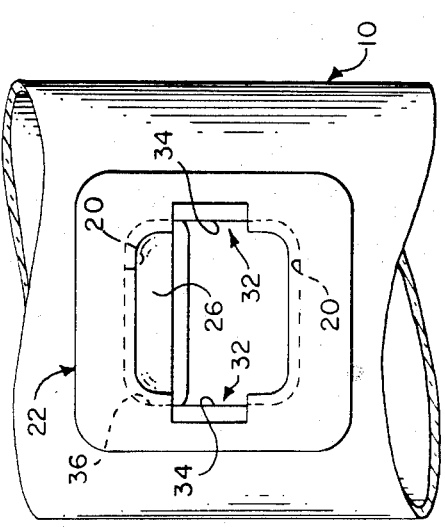

BIRD FEEDER

BACKGROUND AND SUMMARY OF THE INVENTION

This invention relates to improvements in bird feeders and bird feeding devices. More particularly, the invention relates to bird feeders having means by which the type of bird or birds which may use the feeder is selectably controlled. The invention also concerns a bird feeder having improvements in means for quickly and easily filling the bird feeder It is common among those persons who enjoy feeding and observing birds to try to select and control the particular bird species attracted to the bird feeding station. Some birds, particularly certain larger birds such as grackle can easily and often do monopolize the bird feeder to the disadvantage of smaller birds. Smaller birds thus may be required to feed, if at all, from bird seed which may have spilled over or fallen to the ground. As a result the smaller birds often must compete with other animals and birds, making it quite difficult in some instances for the smaller birds to feed.

Among the common bird selection techniques used to select and provide only bird seed which would be more attractive to smaller birds or to a particular species, rather than larger birds. Similarly, as to those persons interested in feeding the larger birds, they too would often select the food of bird seed type or size more likely to be attractive to a larger bird. At best, efforts to distinguish between types of bird attracted by changing bird food is minimally effective. The birds tend to eat whatever is available, larger birds eating larger quantities of smaller sized bird seed and smaller birds breaking the larger bird seed down into smaller edible pieces. Other techniques have included various mechanical devices such as weight-responsive perches intended to shut off access to the feed supply for birds over a certain weight as well as various other devices which have been used, all with varying effectiveness.

Also among the inconveniences encountered with many bird feeders is the awkwardness in refilling the feeder with bird seed. This occurs more often in those bird feeders having special arrangements to minimize the chance of bird seed being knocked out from the bird feeder, for example, with bird feeders having caps or other closures for the inlet and filling openings. It is also among the objects of the present invention to provide a simplified detachable bird feeder which is easily loaded and reattached.

In accordance with one aspect of the invention, the bird feeder includes a container for the bird seed, such as a feed tube, which is provided with a feeding hole to provide access for the bird so that he may reach into the tube. The hole is partly covered by a face plate which includes a baffle extending inwardly into the seed container to form a pocket in the bird seed into which the bird may insert his beak. A perch support device, having a perch at its outer end is detachably and adjustably connected to the container and the face plate. The perch support extends outwardly through the opening in the face plate. The position of the perch support is adjustable to change the position of the perch from a smaller bird feeding position, in which the perch is close to the feeding opening and a larger bird feeding position in which the perch is more spaced from the small bird feeding position. The device may be constructed so that the heightwise position of the perch also changes between the smaller and larger bird feeding positions, in that the perch is in a lower position for the larger birds than for the smaller birds.

In another aspect of the invention the bird feeder is in the form of a tube intended to be suspended vertically and having at least one feed opening in its side and a closure at its bottom to prevent bird seed from falling out. The upper end of the feed tube is provided with a quickly disconnectable bayonet connector which connects to a bayonet socket which forms the head member. The quick disconnect-connect feature of the bayonet facilitates detachment and reloading of the feeder and also provides covering for the filling opening so that the bird seed may not spill out of the filling opening.

It is among the general objects of the invention to provide an improved bird feeder having an adjustable perch by which the size of the bird feeding at the feeder can be controlled.

Another object of the invention is to provide a bird feeder having a perch which is adjustable between a position disposed in proximity to the feeding opening and at least one position for feeding larger birds in which the perch is located farther away from the feed opening than in its location for the smaller birds.

A further object of the invention is to provide a perch device for a bird feeder having novel and improved attachment and connection means to secure the parts of the perch and bird feeding system together.

Another object of the invention is to provide a bird feeder with improved means for detaching, refilling and reattaching the bird feed container.

DESCRIPTION OF THE DRAWINGS

The foregoing and other objects and advantages of the invention will be appreciated more fully from the following further description thereof, with reference to the accompanying drawings wherein:

FIG. 1 is an illustration of a portion of a bird feeder utilizing the adjustable perch support of the present invention;

FIG. 2 is a plan view of a bird feeding station on the bird feeder as seen from the line 2—2 of FIG. 3;

FIG. 3 is a sectional elevation of a bird feeding station as seen along the line 3—3 of FIG. 2;

FIG. 4 is a front elevation of the bird feeding station;

FIG. 4A is an illustration similar to FIG. 4 but with the perch supports and perch removed;

FIG. 5 is a sectional view of a portion of the bird feeding station as seen along the line 5—5 of FIG. 3;

FIG. 6 is an enlarged sectional illustration, in plan, of the juncture between one of the perch supports, the face plate and the feed tube;

FIG. 7 is a side elevation of the perch support;

FIG. 8 is an illustration of a bird feeder having a tubular seed container which is quickly detachable from an overhead support.

DESCRIPTION OF THE ILLUSTRATIVE EMBODIMENT

Figure 9:
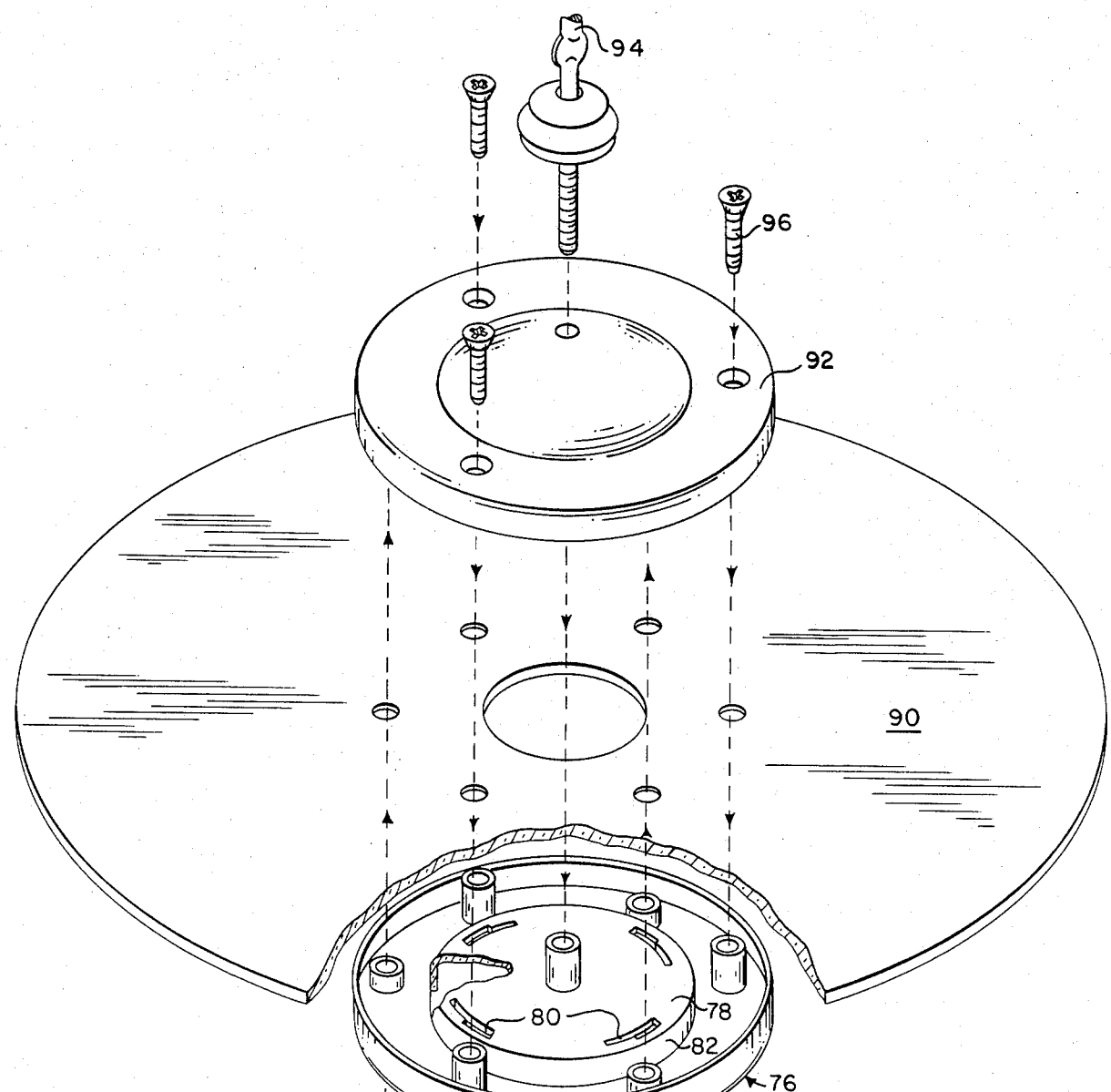
FIG. 9 is an exploded view of the quick-disconnect portion of the bird feeder shown in FIG. 8.

As shown in FIG. 1 the bird feeder includes a container 10 which, in the illustrative embodiment, is in the form of a tube. The feed tube 10 may be supported from its upper end (not shown in FIG. 1). The feed tube 10 preferably is formed from transparent plastic so that its contents may be observed. The bottom end of the feed tube 10 may be closed as by an end cap 14 which may be provided with breathing holes 16 which help to maintain the contents of the feed tube 10 as dry as conditions will permit.

Feed tube 10 is provided with at least one feeding station and, preferably, may be provided with a plurality of heightwise spaced feeding stations, indicated generally at 18. In accordance with the present invention, the feed tube 10 is provided with a cutout opening 20 for each feeding station (FIGS. 3, 4A and 5). The face plate, indicated generally at 22, covers the cutout 20 and preferably is provided with a cylindrical flange 24 or other suitably shaped surface to mate flush against the surface of the feed tube 10. The face plate 22 includes an integral portion 26 which extends through the opening 20 into the interior of the feed tube 10 and serves as a baffle to control the flow of the bird seed and define a pocket in the bird seed. The pocket is illustrated in phantom at 28 in FIG. 3. The face plate 22 may be formed from any suitable material, such as aluminum which is both lightweight and durable. The face plate 22 includes a feed opening 30 which is smaller than the cutout opening 20 in the feed tube and which substantially defines the opening through which the bird will be permitted to feed at that station. The feed opening 30 may be generally rectangular and is provided with a pair of cutout segments 32 on each of its sides. The outer edges 34 of the cutout segments, 32, are selected to be in substantial alignment with the side edges 36 of the tube cutout opening 20, for a purpose described below.

As shown in FIGS. 1 and 4–6 the face plate 22 is held in place on the feed tube 10 by an adjustable perch device indicated generally in FIGS. 2 and 3 at 38. The adjustable perch device includes a pair of perch supports 40, 42 having inner ends 44 disposed inside the feed tube 10 and outer ends to which the perch 46 is attached. The supports 40, 42 extend through the feed opening 30 in the face plate 22. The inner ends 44 of the perch support are connected, and are disposed within the feed tube 10. The perch 46, which may be a tubular member, is attached to and connects the outer ends of the perch supports 40, 42 by a pair of screws 47.

The perch supports 40, 42 serve a number of purposes in combination with the face plate 22, baffle 26, feed opening 30 and feed tube 10. The perch supports 40 are adjustable, generally inwardly and outwardly with respect to the feed opening 30. In addition, the perch supports 40, 42 also include pairs of ridges 48, 50 which serve to hold the perch supports 40, 42 in place as well as to secure the face plate 22 in place on the feed tube 10. Moreover, and as will be described in further detail, the perch supports 40, 42 cooperate with the baffle portion 26 of the face plate 22 to help define the feeding pocket 28 in the bird seed.

As shown in FIG. 7 the perch supports have an outer segment 52 which may be generally straight, and an inner segment 54 which, in the illustrative embodiment, is curved. The pairs of ridges 48, 50 are located on the curved inner segment 54. The first pair of ridges 48 is located at the approximate juncture of the outer and inner perch support segments 52, 54 and the second pair of ridges 50 is located along the inner arcuate segment 54 of the perch supports. The pairs of ridges 48 serve to contain the combined thicknesses of the face plate 22 and feed tube 10, as shown in FIGS. 5 and 6, to grip them and urge them and maintain them together. Each pair of ridges defines facing wedge-like surfaces, 56 which serve to wedge the assembly together as will be described below.

The upper edge 58 of each perch support in the illustrative embodiment is curved and fits against a similarly curved surface 60 formed along the side edges of the baffle 26. Thus, when the device is assembled as shown in FIGS. 1–6 there are a number of interengaging and interlocking surfaces between the perch supports 40, 42, the face plate 22 and the feed tube 10 to secure the parts firmly together. The upper edges 58 of the perch supports 40, 42 will fit firmly against the curved surface 60 formed along the side edges of the baffle 26 in any adjusted position of the perch supports. Thus, the perch supports will engage securely the cover plate 22 as well as the feed tube 10 in all adjusted positions of the device, which are described more fully below. Moreover, the mating cooperation between the upper edges 58 of the perch supports 40, 42 and the mating surface 60 formed along the side edges of the baffle 26 defines a substantial arch and sidewalled configuration which defines a substantial bird feeding pocket to prevent bird seed from spilling out of the feeding opening while defining a suitably sized feeding pocket 28.

As mentioned above, a significant aspect of the invention is the adjustability of the perch between the more retracted position shown in the lower feeding stations in FIG. 1, suited for feeding of small birds to a more extended position shown in the upper portion in FIG. 1 which is more suited to the feeding of larger birds. As is also shown in solid in FIG. 3 in the smaller bird feeding position the perch is located a relatively short distance from the feed opening. A small bird such as a chickadee is able to stand on the perch and reach down and forwardly into the pocket 28. A large bird, however, such as a grackle would not be able to reach into the pocket 28 while standing on the perch because the perch would be too close to the opening 30.

When adjusted to its large bird feeding position shown in phantom in FIG. 3, the perch assembly is shifted so that it is in its more extended position in which the perch 46 is located in a more spaced position. In that position, a larger bird standing on the perch 46 will be able to reach into the opening 30 and pocket 28 whereas a smaller bird will not be able to reach the pocket.

It should be noted that in the illustrative embodiment of the invention the perch supports are constructed so that when the perch is in its more extended, large-bird feeding position the perch is somewhat lower than in its more retracted small bird feeding position. That results from the curved configuration of the inner portions of the perch supports. It should be noted, however, that although it is preferred to have an arrangement in which the large bird feeding feeding position of the perch is both extended and lowered from that of the smaller bird feeding position, the bird selection features of the invention may be employed with a perch in which the height of the perch is maintained substantially the same in the various adjusted positions. Thus, the device could be modified, although to a somewhat less preferred arrangement, to provide a perch which is movable toward and away from the feeding opening but without heightwise adjustment. However, by providing a device in which the perch is adjustable both as to its horizontal and heightwise position, it will be somewhat more convenient for a larger bird to feed from a slightly lowered extended perch. The degree of curve imparted to the inner portions of the perch supports 40, 42 controls the amount, if any, to which the heightwise position of the perch may be adjusted. For example, the inner end of the perch supports may be substantially straight thereby permitting only horizontal adjustment.

The position of the perch 46 in the illustrative embodiment is adjusted by removing and repositioning it. The perch 46 is disassembled by unscrewing the fasteners. The inner ends of the perch supports 40, 42 are provided with a groove and post pivotal connection 62 which permits the forward ends of the perch supports 40, 42 to be drawn together. That, in turn, disengages the ridges 48 or 50 from their grip on the face plate 22 and feed tube 10 which enables the perch supports to be shifted generally radially to align the outer pairs of ridges 50 with the cutout segments 32 of the face plate 22 and the outer edges 36 of the opening 20. Once so positioned the perch supports 40 are again spread apart to their original separation and the perch 46 is reattached at the outward end of the perch supports. The wedge surfaces 56 of the ridges serve to draw the edges of the face plate 22 and feed tube 10 together as the perch supports 40 are spread apart to their original separation.

From the foregoing it will be appreciated that the parts of the feeding station, including the perch supports, cover plate and feed tube are supportable independently by interengagement with each other. There is no need for any separate fasteners to secure the parts to the feed tube and there is no need to secure any part of the system to a diametrically opposite portion of the feed tube. With the construction of the present invention, the cover plate and perch supports can be located anywhere on the feed tube, independently of the location of other feeding stations (if any) on the feed tube. Thus, the present invention may be placed and secured firmly on the bird feeder independently of any of the other feeding stations. This feature of the invention enables variation in the placement and orientation of the feeding stations and enables a bird feeder to be constructed which is adapted to simultaneously, but selectively, feed a plurality of different sizes of birds at different locations along the bird feeder.

FIGS. 8 and 9 illustrate another aspect of the invention by which the feed tube 10 is quickly and easily detachably connected to the support base 12. For that purpose, the upper end of the feed tube 10 is provided with a plurality of circumferentially spaced bayonet-like fingers 70. The fingers may be formed integrally with the upper end of the tube or, preferably as shown, may be formed on a ring 72 attached to the feed tube 10, with the bayonet fingers 70 extending upwardly from the upper edge 74 of the tube. The upper end of tube 10 is intended to be detachably connected, by the bayonet fingers 70, to the overhead support base, indicated generally at 12 in FIG. 8. In the illustrative embodiment of the invention, the support base 12 includes a base member 76 which may be formed from plastic and is provided with a socket portion 78 which receives the upper bayonet fingered end of the feed tube 10. The socket portion 78 is provided with a like number of circumferentially spaced bayonet slots 80 which receive the bayonet fingers 70 and lock with the fingers 70 in a bayonet twisting motion. The socket 78 which receives the upper end of the feed tube 10 preferably is provided with a circumferential wall 82 which, when the upper end of the feed tube is connected to the base 76, surrounds the periphery of the upper end of the feed tube, including the collar 72, to provide enhanced stability for the feed tube. Additionally, by recessing the upper end of the feed tube 10 within the socket, the upper end of the tube is closed and sealed to prevent spillage of bird seed. It should be noted that the base member 76 is illustrated in FIG. 9 being used in conjunction with a squirrel baffle 90 and for the suspension system including a cap 92 and a hanging rod 94. The cap 92 may be secured to the base member 76 by a plurality of screws 96 which extend through preformed holes in each of the cap 92 and base member 76 and are threaded into receptive bosses. The hanging rod 95 may extend through the cap 92 and is threaded into a central boss formed integrally with the base member 76. It should be noted, however, that the quick disconnect bayonet connection between the feeding tube and the base member 76 may be employed in a wide variety of supports for the base member, the foregoing cap and squirrel baffle configuration being but one such system.

From the foregoing it will be appreciated that the feed tube may be easily disconnected by a simple twisting bayonet motion. The tube may be quickly and easily filled from its open end and then may be quickly and easily reattached to the support base.

It should be understood that the foregoing description of the invention is intended merely to be illustrative thereof and that other embodiments and modifications may be apparent to those skilled in the art without departing from its spirit.

Having thus described the invention what we desire to claim and secure by letters patent is:

1. A bird feeder having an adjustable perch comprising:
   a housing to contain bird feed, the housing having an opening through which a bird may feed;
   a perch;
   means for supporting the perch, said means being adjustable to vary the horizontal spacing of the perch with respect to the feeding opening;
   said perch support being constructed and arranged so that the perch is located in a lower position when the perch support is in a more outwardly extended position.

2. A bird feeder as defined in claim 1 wherein the perch is attached to the outwardly disposed end of the perch support.

3. A bird feeder as defined in claim 2 further comprising:
   an aperture formed in the housing;
   a face plate member mounted to the housing and surrounding the aperture in the housing, the face plate member having an aperture which defines the feed opening;
   the face plate member further having a baffle portion thereof projecting through the opening in the housing into the housing;
   the perch support being supported at least in part by the face plate.

4. A bird feeder as defined in claim 3 further comprising:
   said face plate and housing being secured together by the perch support member.

5. A bird feeder as defined in claim 4 wherein the perch support further comprises:
   a pair of elongate perch support members having inner ends and outer ends, the perch being attached to the outer ends, the inner ends being pivotally connected to each other;

the laterally facing sides of the perch support members having connecting means adapted to engage and grip the side edges of the aperture formed in the housing and the side edges of the face plate thereby to retain the face plate and housing together and to maintain and support the perch supports in a predetermined position.

6. A bird feeder as defined in claim 5 wherein the perch support members each have at least two pairs of connectors longitudinally spaced along the length of the perch support members, the pairs of connectors corresponding to different adjusted positions for the perch support.

7. A bird feeder as defined in claim 5 further comprising:
the perch support having an inner curved segment;
means for holding the perch support at selected positions along the length of the perch support whereby holding the perch support along the curved more inwardly disposed portions thereof will retain the perch support in a position in which the perch will be disposed in a more extended and lowered position.

8. A bird feeder as defined in claim 4 in which the inner ends of the perch supports and the cover plate are free of any connection to diametrically opposed portions of the housing or any other feed station in the bird feeder.

9. A bird feeder as defined in claim 3 further comprising:
the perch supports having upper portions adjacent the side edges of the baffle portion of the face plate thereby to define a pair of spaced sidewalls extending downwardly from the sides of the baffle portion, the cooperative portions of the baffle portion and sidewalls defining an arch which forms a pocket in bird feed within the housing while preventing bird feed from flowing out of the opening.

10. A bird feeder having an adjustable perch comprising:
a housing to contain bird feed, the housing having an opening through which a bird may feed;
a perch;
means for supporting the perch, said means being adjustable horizontally toward and away from the housing to vary the horizontal spacing of the perch with respect to the feeding opening and the housing;
said means for supporting the perch being further adjustable to vary the vertical spacing of the perch with respect to the feeding opening;
said perch supporting means comprising a pair of perch supports;
the perch being attached to the outwardly disposed end of the perch supports;
the housing having an aperture formed therein;
a face plate member mounted to the housing and surrounding the aperture in the housing, the face plate member having an aperture which defines the feed opening;
the face plate member further having a baffle portion thereof projecting through the opening in the housing and into the housing;
the perch support being supported at least in part by the face plate member;
the perch supports having upper portions adjacent the side edges of the baffle portion of the face plate thereby to define a pair of spaced sidewalls extending downwardly from the sides of the baffle portion, the cooperative portions of the baffle and sidewalls defining an arch which forms a pocket in the bird seed within the housing while preventing the bird seed from flowing out of the feed opening.

11. A device as defined in claim 10 further comprising:
the perch supports being pivotally connected at their inner ends and being maintained in a spread-apart condition at their outer ends by the perch, the perch, perch supports and apertures in each of the face plate and housing being constructed so that when the perch supports are in their spread, perch-supporting position they will firmly engage the side edges of the apertures of the face plate and housing.

12. A bird feeding station in a bird feeder having a housing and an aperture in the housing, a perch support system comprising:
a face plate member having an aperture therein which defines the feed opening, the face plate being mateable with the housing so that the aperture in the face plate registers with the aperture in the housing, thereby defining a feed opening;
a pair of laterally spaced perch support members extending through the feed opening, and having inner ends disposed within the housing and outer ends extending out of the housing;
a perch connected to the outer extending ends of the perch supports;
means connecting the inner ends of the perch support members;
gripping means formed on the perch support members, each of the gripping means being constructed and arranged so as to grip the face plate and housing to retain them together, the interconnection between the perch support members, face plate and housing comprising the sole means for securing the perch support, face plate and housing together.

13. A bird feeder as defined in claim 12 further comprising:
a face plate having a baffle portion projecting inwardly through the aperture in the housing and into the housing, the perch support members being engageable with the underside of the baffle portion and cooperating with the baffle portion to define an arch which forms a pocket in bird seed contained within the housing and which retards spillage of bird seed from the feeding opening.

* * * * *